United States Patent

Hori et al.

[11] Patent Number: 5,564,413
[45] Date of Patent: Oct. 15, 1996

[54] OIL WELL PIPE FOR A CASING

[75] Inventors: Mitsuaki Hori; Hisao Nakamura; Yoshihiro Okano; Shoichi Ohsuka; Toshiyuki Kurosawa, all of Kawasaki, Japan

[73] Assignee: NKK Corporation, Tokyo, Japan

[21] Appl. No.: 297,583

[22] Filed: Aug. 29, 1994

[30] Foreign Application Priority Data

Sep. 6, 1993 [JP] Japan ................................. 5-245891

[51] Int. Cl.$^6$ ................................................. F16L 57/00
[52] U.S. Cl. .......................... 138/137; 138/103; 138/110; 138/178
[58] Field of Search ................................ 138/103, 109, 138/137, 140, 178, 110; 166/242

[56] References Cited

U.S. PATENT DOCUMENTS

| | | | |
|---|---|---|---|
| 2,230,626 | 2/1941 | Miller | 138/140 |
| 3,916,488 | 11/1975 | Gazda et al. | |
| 4,036,539 | 7/1977 | Saunders et al. | |
| 4,178,949 | 12/1979 | Mazon | 138/110 |
| 4,335,755 | 6/1982 | Sadler et al. | |
| 4,483,396 | 11/1984 | Kennelly | |
| 4,585,681 | 4/1986 | Kidera et al. | |
| 4,796,670 | 1/1989 | Russell et al. | |
| 4,811,785 | 3/1989 | Weber | 166/242 |
| 4,818,148 | 4/1989 | Takeda et al. | |

FOREIGN PATENT DOCUMENTS

| | | | |
|---|---|---|---|
| 1285983 | 1/1962 | France | 138/172 |
| 769788 | 3/1957 | United Kingdom | 166/242 |
| 2107422 | 4/1983 | United Kingdom . | |

OTHER PUBLICATIONS

Magdy Kamal, "Method permits bending polyurethane-coated pipe", Oil & Gas Journal, vol. 76, No. 36, Sep. 1978, Frankfurt, pp. 107–111.

*Primary Examiner*—James E. Bryant, III
*Attorney, Agent, or Firm*—Frishauf, Holtz, Goodman, Langer & Chick, P.C.

[57] ABSTRACT

An oil well pipe for a casing, comprising an oil well body, a sliding layer formed on an outside surface of the oil well body and a protective layer formed on an outside surface of the sliding layer, the sliding layer contains an ethylene-vinyl acetate copolymer having 5 to 60 weight % vinyl acetate. The sliding layer may also contain a maleic acid modified polyethylene or the ethylene-vinyl acetate copolymer may be a maleic acid modified ethylene-vinyl acetate copolymer.

15 Claims, 2 Drawing Sheets

OIL WELL PIPE FOR A CASING

BACKGROUND OF THE INVENTION

1. Field of the Invention

The present invention relates to a oil well pipe for casing, which is not destroyed by ground subsidence.

2. Description of the Related Arts

An oil well for extracting crude oil is formed by a tubing, which is an oil well pipe for drawing up crude oil from the oil reservoir to the ground, and a casing, which is an oil well pipe for protecting the tubing. Since most oil wells are bored substantially in the vertical direction, a downward pulling frictional force acts on the oil well pipe for casing (hereinafter called oil well pipe) due to ground subsidence caused by the extraction of crude oil etc.

In the conventional oil well, however, the aforementioned frictional force acting on the oil well pipe is not always high, so that the possibility that the oil well pipe is destroyed by the frictional force is not always high. Therefore, the measures for reducing the frictional force have not been taken.

Recently, the problem of oil well pipes destroyed by ground subsidence has become serious as the oil wells become deep. The oil well pipes buried in a great depth are subjected to a high underground pressure, so that the acting frictional force is high, and the destruction of oil well pipes cannot be neglected. For this reason, the measures for reducing the frictional force acting between the ground and the oil well pipe have been taken, and the development of an oil well pipe which is not destroyed by ground subsidence has been desired.

SUMMARY OF THE INVENTION

It is an object of the present invention provide an oil well pipe which is less prone to be destroyed by ground subsidence by reducing the frictional force acting on the oil well pipe and a method for making the same.

To achieve the object, the present invention provide an oil well pipe comprising:

an oil well pipe body; and a sliding layer formed on the outside of said oil well pipe body.

Moreover, the present invention provides a method for making a oil well pipe comprising the steps of:

preparing an oil well pipe body; and forming a sliding layer on the outside of said oil well pipe body.

The sliding layer can be made from a material having a stiffness $S(t)$ after t seconds of $10^{-5}$ to $10^3$ N/m² after one year or more has elapsed at a working temperature of the oil well pipe. The stiffness $S(t)$ is expressed by the following equation using a deformation amount $d(t)$ mm after t seconds, a frictional force $\tau$ N/m² and a thickness h mm of the sliding layer:

$$S(t)=3h\cdot\tau/d(t).$$

DESCRIPTION OF THE PREFERRED EMBODIMENT

The oil well pipe in accordance with the present invention has an oil well pipe body and a sliding layer formed on the outside of the oil well pipe body.

If a frictional force due to ground subsidence acts on an oil well pipe buried vertically under the ground, the sliding layer formed on the outside of the oil well pipe and having viscosity is pulled down by a frictional force and is deformed, thereby reducing the frictional force acting on the oil well pipe body.

Figure 3:
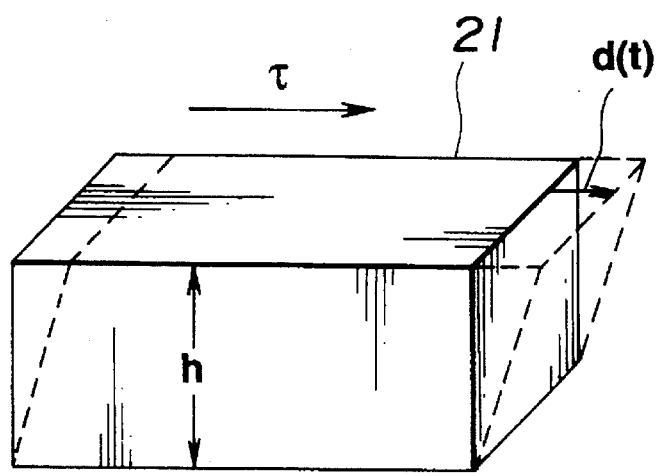
FIG. 3 shows a schematic view illustrating the viscous behavior of a sliding layer.

Specifically, as shown in the schematic view of FIG. 3, when a constant shearing stress (frictional force) $\tau$ acts on the upper surface of a sliding layer 21 showing viscous behavior and having a thickness h, sliding deformation (viscous behavior) as indicated by the broken line in the figure occurs after t seconds.

The relationship between the deformation amount $d(t)$ after t seconds and the frictional force $\tau$ can be expressed by Equation (1) using the stiffness $S(t)$ and the thickness h of the sliding layer.

$$\tau=S(t)\cdot d(t)/3h \tag{1}$$

It can be seen from Eq.(1) that the use of a material having a low stiffness $S(t)$ for the sliding layer decreases the frictional force $\tau$.

The inventors of the present invention conducted model experiments and found that the frictional force $\tau$ should be $2\times10^3$ N/m² or lower in order for the oil well pipe to be less prone to be destroyed by ground subsidence. Further, we found that the destruction of oil well pipe can be prevented almost completely by reducing the frictional force $\tau$ to $2\times10^2$ N/m² or lower.

From these results, we determined a value of $10^3$ N/m² as the stiffness $S(t)$ of the sliding layer which does not cause destruction of oil well pipe assuming that the thickness h of the sliding layer is 2 mm, the deformation amount $d(t)$ or the sliding layer after one year is 20 mm, and a frictional force of $2\times10^3$ N/m² continues to act.

It was found that if the stiffness $S(t)$ after one year has elapsed is $10^3$ N/m² or lower, the oil well pipe is less prone to be destroyed, and if the stiffness $S(t)$ is $10^2$ N/m² or lower, which is the case corresponding to a frictional force of $2\times10^2$ N/m² or lower, the destruction of oil well pipe does not occur substantially.

In other words, a material having a stiffness $S(t)$ after one year exceeding $10^3$ N/m² cannot reduce the frictional force because the deformability is insufficient, having a high possibility of destruction of oil well pipe.

It was also found that if the stiffness $S(t)$ after one year is lower than $10^{-5}$ N/m², the sliding layer is softened and melted.

The stiffness $S(t)$ of the material in accordance with the present invention decreases gradually before one year has elapses. However, after one year has elapsed, the stiffness $S(t)$ scarcely change, being substantially equal to the value at the time when one year has elapsed. Therefore, the range of the stiffness $S(t)$ required is the same after one year has elapsed.

As described above, the oil well pipe in accordance with the present invention has a reduced frictional force between the subsiding ground and the oil well pipe body, preventing the destruction of the oil well pipe, so that a material for the sliding layer is selected in accordance with the temperature at which the oil well pipe is used.

That is to say, the material used for the sliding layer must naturally show the intended viscous behavior in the intended temperature range.

Therefore, when the oil well pipe is used in the temperature range of 100° to 130° C., which now poses a problem of destruction of oil well pipe, a material having a stiffness $S(t)$ in the range of $10^{-5}$ to $10^3$ N/m$^2$ in the temperature range of 100° to 130° C., preferably a material in the range of $10^{-5}$ to $10^2$ N/m$^2$, should be selected as the material for the sliding layer to prevent the destruction of oil well pipe.

Needless to say, it is preferable that this condition should be met even in the temperature range other than the above range. Preferably, a material which has a stiffness $S(t)$ in the above range in a temperature range as wide as possible is selected.

At present, the temperature which oil well pipes are subjected to is 130° C. or lower. As, the result of various investigations on materials meeting the above conditions, it was found that several materials can be used as the sliding layer.

First, asphalt can provide a material having a stiffness $S(t)$ after one year in the range of $10^{-5}$ to $10^3$ N/m$^2$ in the temperature range of 40° to 100° C. by mixing straight asphalt and heated asphalt in the predetermined proportions. The asphalt thus obtained can contain additives such as resin, fat and oil, rubber, pigment, and filler.

Polyethylene can also be used. The softening point of polyethylene can be changed by changing its density. For example, when the oil well pipe is used in the temperature range of 100° to 130° C., polyethylene having a density of 0.930 g/cm$^3$ or lower must be selected to meet the condition of the above range of stiffness $S(t)$ in this temperature range.

Polyethylene having a density exceeding 0.930 g/cm$^3$ has a stiffness $S(t)$ after one year of $10^3$ N/m$^2$ or higher at 100° C., so that it does not soften sufficiently, being incapable of performing the function as the sliding layer. Contrarily, polyethylene having a density of 0.930 g/cm$^3$ or lower has a softening temperature lower than 100° C. so that it can perform the function as the sliding layer because its stiffness $S(t)$ after one year at 100° C. is $10^3$ N/m$^2$ or lower.

For polyethylene having a low density (0.930 g/cm$^3$ or lower), the lower limit of density need not be specified because the condition that the stiffness $S(t)$ after one year at 130° C. is $10^{-5}$ N/m$^2$ or higher is met.

Maleic acid modified polyethylene can also be used. The softening point of maleic acid modified polyethylene can be changed by changing its density. For example, when the oil well pipe is used in the temperature range of 100° to 130° C. maleic acid modified polyethylene having a density of 0.930 g/cm$^3$ or lower must be selected to meet the condition of the above range of stiffness $S(t)$ in this temperature range.

Maleic acid modified polyethylene having a density exceeding 0.930 g/cm$^2$ has a stiffness $S(t)$ after one year of $10^3$ N/m$^2$ or higher at 100° C. so that it does not soften sufficiently, being incapable of performing the function as the sliding layer. Contrarily, maleic acid modified polyethylene having a density of 0.930 g/cm$^3$ or lower has a softening temperature lower than 100 ° C. so that it can perform the function as the sliding layer because its stiffness $S(t)$ after one year at 100° C. is $10^3$ N/m$^2$ or lower.

For maleic acid modified polyethylene having a low density (0.930 g/cm$^3$ or lower), the lower limit of density need not be specified because the condition that the stiffness $S(t)$ after one year at 130° C. is $10^{-5}$ N/m$^2$ or higher is met.

Maleic acid modified polyethylene has high adhesion properties to the steel of the oil well pipe body because it has a polar group of maleic acid.

Ethylene-vinyl acetate copolymer can provide a material for meeting the condition of the above range of stiffness $S(t)$ in the intended temperature range by selecting the optimum composition. Because vinyl acetate has a lower softening temperature than ethylene component, the stiffness $S(t)$ can freely be selected in a fixed range by changing the compounding proportion.

To meet the condition of the above range of stiffness $S(t)$ in the temperature range of 40° to 130° C. the content of vinyl acetate in ethylene-vinyl acetate copolymer may be set at 5 to 60 percent by weight.

Also, maleic acid may be allowed to react with ethylene-vinyl acetate copolymer to yield maleic acid modified ethylene-vinylacetate copolymer in order to form the sliding layer. In this case, the adhesion properties to the steel of the oil well pipe body are high because maleic acid is a polar group.

For the same reason, a material in which maleic acid modified polyethylene is added to ethylene-vinyl acetate copolymer may be used as the sliding layer.

An additive etc. may be mixed with the aforementioned resins as necessary. Such a sliding layer can be formed on the outer peripheral surface of the oil well pipe body, for example, by extrusion coating.

Next, the reason for providing a protective layer will be described. The protective layer serves to prevent the damage to the sliding layer and the oil well pipe body when the oil well pipe is transported or buried. The present invention includes the case where the oil well pipe has a protective layer as necessary.

For the protective layer, a material is used which does not soften in the environment in which the oil well pipe is used. When the upper limit of the working temperature is 130° C. a material having a softening point exceeding 130° C. may be used.

Such materials include polypropylene and polyolefin resin such as ethylene-propylene block copolymer. Preferably, polypropylene or ethylene-propylene block copolymer having a softening temperature of 140° to 170° C. should be used.

When the sliding layer formed from maleic acid modified polyethylene is coated with ethylene-propylene block copolymer, both materials are desirable ones because they have high adhesion properties. Like the sliding layer, an additive etc. can be mixed in the protective layer as necessary.

The protective layer formed from resin can be formed on the outer peripheral surface of the sliding layer, for example, by extrusion coating. On the other hand, a metal such as mild steel is useful as the protective layer. For example, mild steel band may be wound in a spiral form to provide the protective layer. Needless to say, the presence of protective layer has no influence on the frictional force acting on the oil well pipe.

EXAMPLE

Figure 1:
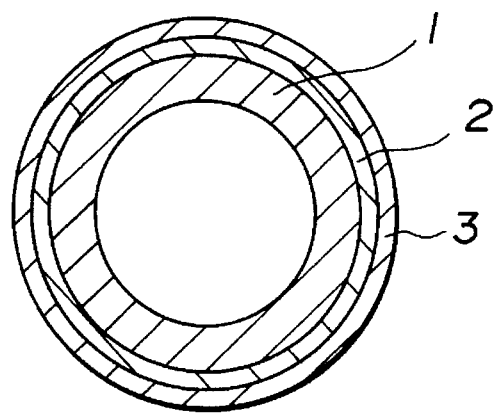
FIG. 1 shows a sectional view of an oil well pipe or the present invention.

An oil well pipe in accordance with a example of the present invention will be described with reference to FIGS. 1 and 2. FIG. 1 is a sectional view of the oil well pipe of this invention. In this figure, reference numeral 1 denotes an oil well pipe body, 2 denotes a sliding layer, and 3 denotes a protective layer.

Figure 2:
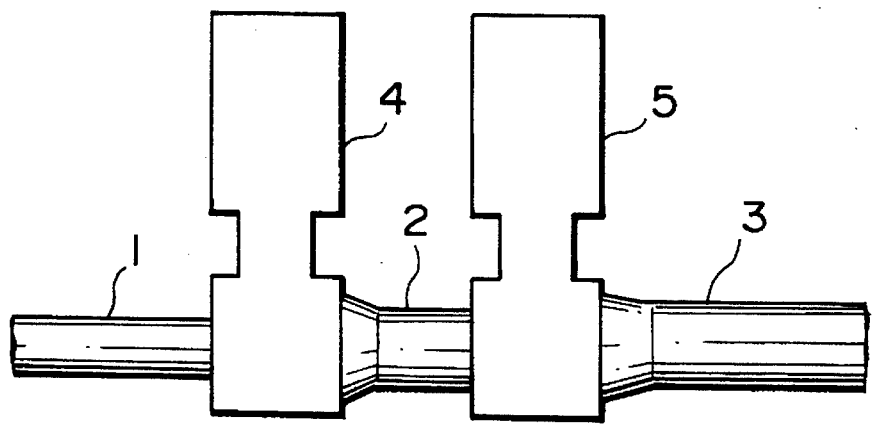
FIG. 2 shows a schematic view illustrating a method for making an oil well pipe of the present invention.

FIG. 2 is a schematic view illustrating a method for manufacturing the oil well pipe. The oil well pipe is manufactured by applying extrusion coating of sliding layer 2 on the outer peripheral surface of the oil well pipe body 1 by means of a sliding layer extruding machine 4 and by applying extrusion coating of protective layer 3 on the outer peripheral surface of the sliding layer 2 by means of a protective layer extruding machine 5.

The steel pipe used is an oil well pipe having an outside diameter of 177.8 mm, a wall thickness of 23.8 mm, and a length of 12,000 mm. On its outer peripheral surface, the sliding layer 2 was formed by extruding melted asphalt, polyethylene, maleic acid modified polyethylene, ethylene-vinyl acetate copolymer, maleic acid modified vinylacetate copolymer, or a mixture of ethylene-vinyl acetate copolymer and maleic acid modified polyethylene by using the sliding layer extruding machine 4. The thickness of the sliding layer is 1 mm for Example Nos. 10, 13, and 15 and Control Nos. 1 and 2, and 2 mm for others.

The protective layer 3 was formed on the outer peripheral surface of the sliding layer 2 by extruding melted polyethylene, polypropylene, or ethylene-propylene block polymer by using the protective layer extruding machine 5. The thickness of the protective layer is 4 mm for Example No. 10, and 3 mm for others. Further, an oil well pipe having a protective layer in which a 0.3 mm-thick, 200 mm-wide mild steel band was wound in a spiral form was manufactured. Needless to say, pipes having no protective layer were manufactured as the examples and the controls. Among these examples and controls, Example Nos. 1 to 15 and Control Nos. 1 to 4 are given in Table 1, Example Nos. 1 to 4 in Table 2, and Example Nos. 45 to 60 in Table 3.

For the oil well pipes of Example Nos. 1 to 60 and Control Nos. 1 to 4, the stiffness S(t) of the sliding layer at temperatures of 40° C., 50° C., 60° C., 70° C., 80° C., 90° C., 100° C., 110° C., 120° C., and 130° C. after one year has elapsed, and the stability of the protective layer after being left in a furnace of the same temperatures for one hour were examined. The results of these examinations are given in Tables 4 to 6.

The oil well pipes of Example Nos. 1 to 60 can be used in the temperature range in which the stiffness S(t) after one year has elapsed is in the range of $10^{-5}$ to $10^3$ N/m$^2$. In this temperature range, there is little possibility that the oil well pipes are destructed by ground subsidence. It is very safe to use oil well pipes in the temperature range in which the stiffness S(t) is in the range of $10^{-5}$ to $10^2$ N/m$^2$.

Contrarily, it is found that the stiffness S(t) after one year has elapsed exceeds $10^3$ N/m$^2$ at temperatures not higher than 120° C. in Control Nos. 1 and 2 and at any temperatures in Control Nos. 3 and 4, so that the frictional force is high, and the oil well pipes are prone to be destroyed by ground subsidence.

The oil well pipes in Example Nos. 1 to 60 show no abnormality in a wide temperature range, so that the damage to the sliding layer and oil well pipe body can be prevented not only when the oil well pipe is transported but also when it is buried.

Thus, the oil well pipe having the sliding layer formed from a material consisting mainly of asphalt, polyethylene, maleic acid modified polyethylene, ethylene-vinyl acetate copolymer, maleic acid modified vinylacetate copolymer, or a mixture of these materials is very safe against the destruction caused by ground subsidence when it is used in a temperature range of normal temperature to 130° C.

The present invention prevents the destruction of oil well pipes caused by ground subsidence, and also prevents the damage to the sliding layer and the oil well pipe body not only when the oil well pipe is transported but also when it is buried.

TABLE 1

| Items | Number of Example or Control | Material for Sliding Layer | Thickness (mm) | Density (g/cm$^3$) | Material for Protective Layer | Thickness (mm) |
|---|---|---|---|---|---|---|
| Example of Present Invention | 1 | Mixed Asphalt | 2 | — | None | — |
| | 2 | Heated Asphalt | 2 | — | None | — |
| | 3 | Mixed Asphalt | 2 | — | Polyethylene | 3 |
| | 4 | Heated Asphalt | 2 | — | Polypropylene | 3 |
| | 5 | Heated Asphalt | 2 | — | Mild Steel | 0.3 |
| | 6 | Polyethylene | 2 | 0.925 | None | — |
| | 7 | Polyethylene | 2 | 0.912 | Polypropylene | 3 |
| | 8 | Polyethylene | 2 | 0.900 | Mild Steel | 0.3 |
| | 9 | Maleic Acid Modified Polyethylene | 2 | 0.928 | No layer | — |
| | 10 | Maleic Acid Modified Polyethylene | 1 | 0.928 | Polypropylene | 4 |
| | 11 | Maleic Acid Modified Polyethylene | 2 | 0.928 | Polypropylene | 3 |
| | 12 | Maleic Acid Modified Polyethylene | 2 | 0.928 | E.P.B.C. | 3 |
| | 13 | Maleic Acid Modified Polyethylene | 1 | 0.915 | E.P.B.C. | 3 |
| | 14 | Maleic Acid Modified Polyethylene | 2 | 0.900 | E.P.B.C. | 3 |
| | 15 | Maleic Acid Modified Polyethylene | 1 | 0.900 | Mild Steel | 0.3 |
| Control | 1 | Maleic Acid Modified Polyethylene | 1 | 0.936 | None | — |
| | 2 | Maleic Acid Modified Polyethylene | 1 | 0.936 | Polyethylene | 1 |
| | 3 | Polypropylene | 2 | — | E.P.B.C. | 3 |
| | 4 | Ethylene-Propylene Block Copolymer | 2 | — | Polypropylene | 3 |

Note:
"E.P.B.C." means Ethylene-Propylene Block Copolymer.

TABLE 2

| Items | Number of Example or Control | Material for Sliding Layer | Thickness (mm) | Mixing Proportion of A (wt. %) | Mixing Proportion of B (wt. %) | Material for Protective Layer | Thickness (mm) |
|---|---|---|---|---|---|---|---|
| Example of Present Invention | 16 | Ethylene-Vinyl Acetate Copolymer | 2 | 6 | 0 | None | — |
| | 17 | Ethylene-Vinyl Acetate Copolymer | 2 | 6 | 0 | E.P.B.C. | 3 |
| | 18 | Ethylene-Vinyl Acetate Copolymer | 2 | 6 | 0 | Polypropylene | 3 |
| | 19 | Ethylene-Vinyl Acetate Copolymer | 2 | 6 | 0 | Mild Steel | 0.3 |
| | 20 | Ethylene-Vinyl Acetate Copolymer | 2 | 6 | 0 | Polyethylene | 3 |
| | 21 | Ethylene-Vinyl Acetate Copolymer | 2 | 10 | 0 | Polypropylene | 3 |
| | 22 | Ethylene-Vinyl Acetate Copolymer | 2 | 14 | 0 | E.P.B.C. | 3 |
| | 23 | Ethylene-Vinyl Acetate Copolymer | 2 | 19 | 0 | E.P.B.C. | 3 |
| | 24 | Ethylene-Vinyl Acetate Copolymer | 2 | 19 | 10 | E.P.B.C. | 3 |
| | 25 | Ethylene-Vinyl Acetate Copolymer | 2 | 19 | 25 | None | — |
| | 26 | Ethylene-Vinyl Acetate Copolymer | 2 | 19 | 25 | E.P.B.C. | 3 |
| | 27 | Ethylene-Vinyl Acetate Copolymer | 2 | 19 | 25 | Polypropylene | 3 |
| | 28 | Ethylene-Vinyl Acetate Copolymer | 2 | 19 | 25 | Mild Steel | 0.3 |
| | 29 | Ethylene-Vinyl Acetate Copolymer | 2 | 19 | 25 | Polyethylene | 3 |
| | 30 | Ethylene-Vinyl Acetate Copolymer | 2 | 19 | 50 | Polyethylene | 3 |
| | 31 | Ethylene-Vinyl Acetate Copolymer | 2 | 25 | 0 | E.P.B.C. | 3 |
| | 32 | Ethylene-Vinyl Acetate Copolymer | 2 | 33 | 0 | Polyethylene | 3 |
| | 33 | Ethylene-Vinyl Acetate Copolymer | 2 | 33 | 10 | E.P.B.C. | 3 |
| | 34 | Ethylene-Vinyl Acetate Copolymer | 2 | 33 | 25 | Polyethylene | 3 |
| | 35 | Ethylene-Vinyl Acetate Copolymer | 2 | 33 | 50 | E.P.B.C. | 3 |
| | 36 | Ethylene-Vinyl Acetate Copolymer | 2 | 41 | 0 | E.P.B.C. | 3 |
| | 37 | Ethylene-Vinyl Acetate Copolymer | 2 | 46 | 0 | Polyethylene | 3 |
| | 38 | Ethylene-Vinyl Acetate Copolymer | 2 | 46 | 10 | E.P.B.C. | 3 |
| | 39 | Ethylene-Vinyl Acetate Copolymer | 2 | 46 | 25 | Polyethylene | 3 |
| | 40 | Ethylene-Vinyl Acetate Copolymer | 2 | 46 | 50 | None | — |
| | 41 | Ethylene-Vinyl Acetate Copolymer | 2 | 46 | 50 | E.P.B.C. | 3 |
| | 42 | Ethylene-Vinyl Acetate Copolymer | 2 | 46 | 50 | Polypropylene | 3 |
| | 43 | Ethylene-Vinyl Acetate Copolymer | 2 | 46 | 50 | Mild Steel | 0.3 |
| | 44 | Ethylene-Vinyl Acetate Copolymer | 2 | 46 | 50 | Polyethylene | 3 |

Notes
1. "A" shown in the item column means "Vinyle-Acetate in Ethylene-Vinylacetate Copolymer".
2. "B" shown in the item column means "Maleic Acid Modified Polyethylene".
3. "E.P.B.C." means Ethylene-Propylene Block Copolymer.

TABLE 3

| Items | Number of Example or Control | Material for Sliding Layer | Thickness (mm) | Mixing Proportion of A (wt. %) | Material for Protective Layer | Thickness (mm) |
|---|---|---|---|---|---|---|
| Example of Present Invention | 45 | Maleic Acid Modified Vinylacetate Copolymer | 2 | 6 | None | — |
| | 46 | Maleic Acid Modified Vinylacetate Copolymer | 2 | 6 | E.P.B.C. | 3 |
| | 47 | Maleic Acid Modified Vinylacetate Copolymer | 2 | 6 | Polypropylene | 3 |
| | 48 | Maleic Acid Modified Vinylacetate Copolymer | 2 | 6 | Mild Steel | 0.3 |
| | 49 | Maleic Acid Modified Vinylacetate Copolymer | 2 | 6 | Polyethylene | 3 |
| | 50 | Maleic Acid Modified Vinylacetate Copolymer | 2 | 10 | Polypropylene | 3 |
| | 51 | Maleic Acid Modified Vinylacetate Copolymer | 2 | 14 | Polypropylene | 3 |
| | 52 | Maleic Acid Modified Vinylacetate Copolymer | 2 | 19 | Polypropylene | 3 |
| | 53 | Maleic Acid Modified Vinylacetate Copolymer | 2 | 25 | Polypropylene | 3 |
| | 54 | Maleic Acid Modified Vinylacetate Copolymer | 2 | 33 | Polypropylene | 3 |
| | 55 | Maleic Acid Modified Vinylacetate Copolymer | 2 | 41 | Polypropylene | 3 |
| | 56 | Maleic Acid Modified Vinylacetate Copolymer | 2 | 46 | None | — |
| | 57 | Maleic Acid Modified Vinylacetate Copolymer | 2 | 46 | E.P.B.C. | 3 |
| | 58 | Maleic Acid Modified Vinylacetate Copolymer | 2 | 46 | Polypropylene | 3 |
| | 59 | Maleic Acid Modified Vinylacetate Copolymer | 2 | 46 | None | — |
| | 60 | Maleic Acid Modified Vinylacetate Copolymer | 2 | 46 | Polyethylene | 3 |

Notes
1. "A" shown in the item column means "Vinyl-Acetate in Ethylene-Vinylacetate Copolymer".
2. "E.P.B.C." means Ethylene-Propylene Block Copolymer.

TABLE 4

| Items | Number of Example or Control | Stiffness S(t) of Sliding Layer (N/m²) | | | | | | | | | Usable Temperature Range (°C.) | Preferable Temperature Range (°C.) |
|---|---|---|---|---|---|---|---|---|---|---|---|---|
| | | 40° C. | 50° C. | 60° C. | 70° C. | 80° C. | 90° C. | 100° C. | 110° C. | 120° C. | 130° C. | | |
| Example of Present Invention | 1 | $10^3$ | $10^1$ | $10^{-3}$ | $10^{-5}$ | $<10^{-5}$ | | | | | | 40~70 | 50~70 |
| | 2 | $10^4$ | $10^2$ | $10^0$ | $10^{-1}$ | $10^{-3}$ | $10^{-4}$ | $10^{-5}$ | $<10^{-5}$ | | | 50~100 | 50~100 |
| | 3 | $10^3$ | $10^1$ | $10^{-3}$ | $10^{-5}$ | $<10^{-5}$ | | | | | | 40~70 | 50~70 |
| | 4 | $10^4$ | $10^2$ | $10^0$ | $10^{-1}$ | $10^{-3}$ | $10^{-4}$ | $10^{-5}$ | $<10^{-5}$ | | | 50~100 | 50~100 |
| | 5 | $10^4$ | $10^2$ | $10^0$ | $10^{-1}$ | $10^{-3}$ | $10^{-4}$ | $10^{-5}$ | $<10^{-5}$ | | | 50~100 | 50~100 |
| | 6 | | | $>10^7$ | $10^7$ | $10^6$ | $10^4$ | $10^0$ | $10^0$ | $10^{-1}$ | $10^{-2}$ | 100~130 | 100~130 |
| | 7 | | | $>10^7$ | $10^4$ | $10^5$ | $10^2$ | $10^{-1}$ | $10^{-1}$ | $10^{-1}$ | $10^{-2}$ | 90~130 | 90~130 |
| | 8 | | | $>10^7$ | $10^4$ | $10^5$ | $10^2$ | $10^{-1}$ | $10^{-1}$ | $10^{-1}$ | $10^{-3}$ | 90~130 | 90~130 |
| | 9 | | | $>10^7$ | $10^7$ | $10^6$ | $10^3$ | $10^0$ | $10^0$ | $10^{-1}$ | $10^{-2}$ | 90~130 | 100~130 |
| | 10 | | | $>10^7$ | $10^7$ | $10^6$ | $10^3$ | $10^0$ | $10^0$ | $10^{-1}$ | $10^{-2}$ | 90~130 | 100~130 |
| | 11 | | | $>10^7$ | $10^7$ | $10^6$ | $10^3$ | $10^0$ | $10^0$ | $10^{-1}$ | $10^{-2}$ | 90~130 | 100~130 |
| | 12 | | | $>10^7$ | $10^7$ | $10^6$ | $10^3$ | $10^0$ | $10^0$ | $10^{-1}$ | $10^{-2}$ | 90~130 | 100~130 |
| | 13 | | | $>10^7$ | $10^5$ | $10^4$ | $10^1$ | $10^{-1}$ | $10^{-1}$ | $10^{-2}$ | $10^{-3}$ | 90~130 | 90~130 |
| | 14 | | | $>10^7$ | $10^6$ | $10^4$ | $10^1$ | $10^{-1}$ | $10^{-1}$ | $10^{-2}$ | $10^{-3}$ | 90~130 | 90~130 |
| | 15 | | | $>10^7$ | $10^6$ | $10^4$ | $10^1$ | $10^{-1}$ | $10^{-1}$ | $10^{-2}$ | $10^{-3}$ | 90~130 | 90~130 |
| Control | 1 | | | | | $>10^7$ | $10^7$ | $2 \times 10^6$ | $10^6$ | $10^5$ | $10^{-2}$ | 130 | 130 |
| | 2 | | | | | $>10^7$ | $10^7$ | $2 \times 10^6$ | $10^6$ | $10^5$ | $10^{-2}$ | 130 | 130 |
| | 3 | | | | | | | | $>10^7$ | $10^7$ | $10^7$ | None | None |
| | 4 | | | | | | | | $>10^7$ | $10^7$ | $10^7$ | None | None |

TABLE 5 (A)

| Items | Number of Example | Stiffness S(t) of Sliding Layer (N/m²) | | | | | | | | | | Usable Temperature Range (°C.) | Preferable Temperature Range (°C.) |
|---|---|---|---|---|---|---|---|---|---|---|---|---|---|
| | | 40° C. | 50° C. | 60° C. | 70° C. | 80° C. | 90° C. | 100° C. | 110° C. | 120° C. | 130° C. | | |
| Example of Present Invention | 16 | $>10^7$ | $10^7$ | $10^7$ | $10^7$ | $10^6$ | $10^5$ | $10^4$ | $10^2$ | $10^0$ | $10^{-2}$ | 110~130 | 110~130 |
| | 17 | $>10^7$ | $10^7$ | $10^7$ | $10^7$ | $10^6$ | $10^5$ | $10^4$ | $10^2$ | $10^0$ | $10^{-2}$ | 110~130 | 110~130 |
| | 18 | $>10^7$ | $10^7$ | $10^7$ | $10^7$ | $10^6$ | $10^5$ | $10^4$ | $10^2$ | $10^0$ | $10^{-2}$ | 110~130 | 110~130 |
| | 19 | $>10^7$ | $10^7$ | $10^7$ | $10^7$ | $10^6$ | $10^5$ | $10^4$ | $10^2$ | $10^0$ | $10^{-2}$ | 110~130 | 110~130 |
| | 20 | $>10^7$ | $10^7$ | $10^7$ | $10^7$ | $10^6$ | $10^5$ | $10^4$ | $10^2$ | $10^0$ | $10^{-2}$ | 110~130 | 110~130 |
| | 21 | $>10^7$ | $10^7$ | $10^7$ | $10^7$ | $10^6$ | $10^5$ | $10^3$ | $10^2$ | $10^{-1}$ | $10^{-2}$ | 100~130 | 110~130 |
| | 22 | $10^7$ | $10^7$ | $10^6$ | $10^6$ | $10^5$ | $10^3$ | $10^0$ | $10^{-1}$ | $10^{-2}$ | $10^{-3}$ | 90~130 | 100~130 |
| | 23 | $10^7$ | $10^7$ | $10^6$ | $10^5$ | $10^4$ | $10^1$ | $10^{-2}$ | $10^{-2}$ | $10^{-3}$ | $10^{-4}$ | 90~130 | 90~130 |
| | 31 | $10^6$ | $10^6$ | $10^5$ | $10^4$ | $10^3$ | $10^0$ | $10^{-2}$ | $10^{-3}$ | $10^{-5}$ | $<10^{-5}$ | 80~120 | 90~120 |
| | 32 | $10^5$ | $10^3$ | $10^1$ | $10^{-1}$ | $10^{-2}$ | $10^{-2}$ | $10^{-3}$ | $10^{-4}$ | $10^{-5}$ | $<10^{-5}$ | 60~120 | 50~120 |
| | 36 | $10^4$ | $10^2$ | $10^0$ | $10^{-1}$ | $10^{-3}$ | $10^{-3}$ | $10^{-4}$ | $10^{-5}$ | $<10^{-5}$ | $<10^{-5}$ | 50~120 | 50~120 |
| | 37 | $10^0$ | $10^0$ | $10^{-1}$ | $10^{-2}$ | $10^{-3}$ | $10^{-3}$ | $10^{-4}$ | $10^{-5}$ | $<10^{-5}$ | $<10^{-5}$ | 40~110 | 40~120 |
| | 24 | $10^7$ | $10^7$ | $10^6$ | $10^5$ | $10^4$ | $10^1$ | $10^{-2}$ | $10^{-2}$ | $10^{-3}$ | $10^{-4}$ | 90~130 | 90~130 |
| | 25 | $10^7$ | $10^7$ | $10^6$ | $10^5$ | $10^4$ | $10^1$ | $10^{-2}$ | $10^{-2}$ | $10^{-3}$ | $10^{-4}$ | 90~130 | 90~130 |
| | 26 | $10^7$ | $10^7$ | $10^6$ | $10^5$ | $10^4$ | $10^1$ | $10^{-2}$ | $10^{-2}$ | $10^{-3}$ | $10^{-4}$ | 90~130 | 90~130 |
| | 27 | $10^7$ | $10^7$ | $10^6$ | $10^5$ | $10^4$ | $10^1$ | $10^{-2}$ | $10^{-2}$ | $10^{-3}$ | $10^{-4}$ | 90~130 | 90~130 |
| | 28 | $10^7$ | $10^7$ | $10^6$ | $10^5$ | $10^4$ | $10^1$ | $10^{-2}$ | $10^{-2}$ | $10^{-3}$ | $10^{-4}$ | 90~130 | 90~130 |
| | 29 | $10^7$ | $10^7$ | $10^6$ | $10^5$ | $10^4$ | $10^1$ | $10^{-2}$ | $10^{-2}$ | $10^{-3}$ | $10^{-4}$ | 90~130 | 90~130 |
| | 30 | $10^7$ | $10^7$ | $10^6$ | $10^5$ | $10^4$ | $10^1$ | $10^{-2}$ | $10^{-2}$ | $10^{-3}$ | $10^{-4}$ | 90~130 | 90~130 |
| | 33 | $10^5$ | $10^4$ | $10^3$ | $10^{-1}$ | $10^{-2}$ | $10^{-2}$ | $10^{-3}$ | $10^{-4}$ | $10^{-5}$ | $<10^{-5}$ | 60~120 | 70~120 |
| | 34 | $10^6$ | $10^5$ | $10^4$ | $10^1$ | $10^{-1}$ | $10^{-1}$ | $10^{-2}$ | $10^{-3}$ | $10^{-4}$ | $<10^{-5}$ | 70~120 | 70~120 |
| | 35 | $10^6$ | $10^6$ | $10^5$ | $10^2$ | $10^{-1}$ | $10^{-1}$ | $10^{-2}$ | $10^{-3}$ | $10^{-4}$ | $<10^{-5}$ | 70~120 | 70~120 |

TABLE 5 (B)

| Items | Number of Example | Stiffness S(t) of Sliding Layer (N/m$^2$) | | | | | | | | | | Usable Temperature Range (°C.) | Preferable Temperature Range (°C.) |
|---|---|---|---|---|---|---|---|---|---|---|---|---|---|
| | | 40° C. | 50° C. | 60° C. | 70° C. | 80° C. | 90° C. | 100° C. | 110° C. | 120° C. | 130° C. | | |
| | 38 | $10^3$ | $10^3$ | $10^3$ | $10^{-1}$ | $10^{-2}$ | $10^{-3}$ | $10^{-4}$ | $10^{-5}$ | $<10^{-5}$ | $<10^{-5}$ | 40~110 | 70~110 |
| | 39 | $10^4$ | $10^4$ | $10^4$ | $10^1$ | $10^{-1}$ | $10^{-2}$ | $10^{-3}$ | $10^{-4}$ | $<10^{-5}$ | $<10^{-5}$ | 70~110 | 70~110 |
| | 40 | $10^5$ | $10^5$ | $10^5$ | $10^2$ | $10^0$ | $10^{-2}$ | $10^{-3}$ | $10^{-4}$ | $10^{-5}$ | $<10^{-5}$ | 70~110 | 70~110 |
| | 41 | $10^5$ | $10^5$ | $10^5$ | $10^2$ | $10^0$ | $10^{-2}$ | $10^{-3}$ | $10^{-4}$ | $10^{-5}$ | $<10^{-5}$ | 70~110 | 70~110 |
| | 42 | $10^5$ | $10^5$ | $10^5$ | $10^2$ | $10^0$ | $10^{-2}$ | $10^{-3}$ | $10^{-4}$ | $10^{-5}$ | $<10^{-5}$ | 70~110 | 70~110 |
| | 43 | $10^5$ | $10^5$ | $10^5$ | $10^2$ | $10^0$ | $10^{-2}$ | $10^{-3}$ | $10^{-4}$ | $10^{-5}$ | $<10^{-5}$ | 70~110 | 70~110 |
| | 44 | $10^5$ | $10^5$ | $10^5$ | $10^2$ | $10^0$ | $10^{-2}$ | $10^{-3}$ | $10^{-4}$ | $10^{-5}$ | $<10^{-5}$ | 70~110 | 70~110 |
| Example of Present Invention | 45 | $>10^7$ | $10^7$ | $10^7$ | $10^7$ | $10^6$ | $10^5$ | $10^4$ | $10^2$ | $10^0$ | $10^{-2}$ | 110~130 | 110~130 |
| | 46 | $>10^7$ | $10^7$ | $10^7$ | $10^7$ | $10^6$ | $10^5$ | $10^4$ | $10^2$ | $10^0$ | $10^{-2}$ | 110~130 | 110~130 |
| | 47 | $>10^7$ | $10^7$ | $10^7$ | $10^7$ | $10^6$ | $10^5$ | $10^4$ | $10^2$ | $10^0$ | $10^{-2}$ | 110~130 | 110~130 |
| | 49 | $>10^7$ | $10^7$ | $10^7$ | $10^7$ | $10^6$ | $10^5$ | $10^4$ | $10^2$ | $10^0$ | $10^{-2}$ | 110~130 | 110~130 |
| | 50 | $>10^7$ | $10^7$ | $10^7$ | $10^7$ | $10^6$ | $10^5$ | $10^3$ | $10^2$ | $10^{-1}$ | $10^{-2}$ | 100~130 | 110~130 |
| | 51 | $10^7$ | $10^7$ | $10^6$ | $10^6$ | $10^5$ | $10^3$ | $10^0$ | $10^{-1}$ | $10^{-2}$ | $10^{-3}$ | 90~130 | 100~130 |
| | 52 | $10^7$ | $10^7$ | $10^6$ | $10^5$ | $10^4$ | $10^1$ | $10^{-2}$ | $10^{-2}$ | $10^{-3}$ | $10^{-4}$ | 90~130 | 90~130 |
| | 53 | $10^6$ | $10^6$ | $10^5$ | $10^4$ | $10^3$ | $10^0$ | $10^{-2}$ | $10^{-3}$ | $10^{-5}$ | $<10^{-5}$ | 80~120 | 90~120 |
| | 54 | $10^5$ | $10^3$ | $10^1$ | $10^{-1}$ | $10^{-2}$ | $10^{-2}$ | $10^{-3}$ | $10^{-4}$ | $10^{-5}$ | $<10^{-5}$ | 60~120 | 50~120 |
| | 55 | $10^4$ | $10^2$ | $10^0$ | $10^{-1}$ | $10^{-3}$ | $10^{-3}$ | $10^{-4}$ | $10^{-5}$ | $<10^{-5}$ | $<10^{-5}$ | 50~120 | 50~120 |
| | 56 | $10^0$ | $10^0$ | $10^{-1}$ | $10^{-2}$ | $10^{-3}$ | $10^{-3}$ | $10^{-4}$ | $10^{-5}$ | $<10^{-5}$ | $<10^{-5}$ | 40~110 | 40~110 |
| | 57 | $10^0$ | $10^0$ | $10^{-1}$ | $10^{-2}$ | $10^{-3}$ | $10^{-3}$ | $10^{-4}$ | $10^{-5}$ | $<10^{-5}$ | $<10^{-5}$ | 40~110 | 40~110 |
| | 58 | $10^0$ | $10^0$ | $10^{-1}$ | $10^{-2}$ | $10^{-3}$ | $10^{-3}$ | $10^{-4}$ | $10^{-5}$ | $<10^{-5}$ | $<10^{-5}$ | 40~110 | 40~110 |
| | 59 | $10^0$ | $10^0$ | $10^{-1}$ | $10^{-2}$ | $10^{-3}$ | $10^{-3}$ | $10^{-4}$ | $10^{-5}$ | $<10^{-5}$ | $<10^{-5}$ | 40~110 | 40~110 |
| | 60 | $10^0$ | $10^0$ | $10^{-1}$ | $10^{-2}$ | $10^{-3}$ | $10^{-3}$ | $10^{-4}$ | $10^{-5}$ | $<10^{-5}$ | $<10^{-5}$ | 40~110 | 40~110 |

TABLE 6(A)

| Items | No. of Example or Control | Durability of Protective Layer | |
|---|---|---|---|
| | | <120° C. | 130° C. |
| Example of Present Invention | 1 | — | — |
| | 2 | — | — |
| | 3 | o | x |

TABLE 6(B)

| Items | No. of Example or Control | Durability of Protective Layer | |
|---|---|---|---|
| | | <120° C. | 130° C. |
| Example of Present Invention | 16 | — | — |
| | 17 | o | o |
| | 18 | o | o |
| | 19 | o | o |
| | 20 | o | x |
| | 21 | o | o |
| | 22 | o | o |
| | 23 | o | o |

TABLE 6(B)-continued

| Items | No. of Example or Control | Durability of Protective Layer | |
|---|---|---|---|
| | | <120° C. | 130° C. |
| | 24 | o | o |
| | 25 | — | — |
| | 26 | o | o |
| | 27 | o | o |
| | 28 | o | o |
| | 29 | o | x |
| | 30 | o | x |
| | 31 | o | o |
| | 32 | o | x |
| | 33 | o | o |
| | 34 | o | x |
| | 35 | o | o |
| | 36 | o | o |
| | 37 | o | x |
| | 38 | o | o |
| | 39 | o | x |
| | 40 | — | — |
| | 41 | o | o |
| | 42 | o | o |
| | 43 | o | o |
| | 44 | o | x |

Notes:
Symbol of "o" means "durable"; and Symbol of "x" softened and deformed".

TABLE 6(C)

| Items | No. of Example or Control | Durability of Protective Layer | |
|---|---|---|---|
| | | <120° C. | 130° C. |
| Example of Present Invention | 45 | — | — |
| | 46 | o | o |
| | 47 | o | o |
| | 48 | o | o |
| | 49 | o | x |
| | 50 | o | o |
| | 51 | o | o |
| | 52 | o | o |
| | 53 | o | o |
| | 54 | o | o |
| | 55 | o | o |
| | 56 | — | — |
| | 57 | o | o |
| | 58 | o | o |
| | 59 | o | o |
| | 60 | o | x |

Notes:
Symbol of "o" means "durable"; and Symbol of "x" softened and deformed".

TABLE 6(A)-continued

| Items | No. of Example or Control | Durability of Protective Layer <120° C. | Durability of Protective Layer 130° C. |
|---|---|---|---|
|  | 4 | o | o |
|  | 5 | o | o |
|  | 6 | — | — |
|  | 7 | o | o |
|  | 8 | o | o |
|  | 9 | — | — |
|  | 10 | o | o |
|  | 11 | o | o |
|  | 12 | o | o |
|  | 13 | o | o |
|  | 14 | o | o |
|  | 15 | o | o |
| Control | 1 | — | — |
|  | 2 | o | x |
|  | 3 | o | o |
|  | 4 | o | o |

Notes:
Symbol of "o" means "durable"; and Symbol of "x" softened and deformed".

What is claimed is:

1. An oil well pipe for a casing comprising:

an oil well pipe body;

a sliding layer formed on an outside surface of said oil well pipe body, said sliding layer comprising an ethylene-vinyl acetate copolymer, said ethylene-vinyl acetate copolymer containing vinyl acetate in an amount of 5 to 60 percent by weight; and a protective layer which is formed on an outside surface of the sliding layer.

2. The oil well pipe of claim 1, wherein said protective layer comprises polyolefin resin.

3. The oil well pipe of claim 2, wherein the polyolefin resin is an ethylene-propylene block copolymer.

4. The oil well pipe of claim 2, wherein the ethylene-propylene block copolymer has a softening temperature of 140° to 170° C.

5. The oil well pipe of claim 4, wherein the sliding layer has a thickness of 1 mm to 2 mm and the protective layer has a thickness of 3 mm to 4 mm.

6. An oil well pipe for a casing comprising:

an oil well pipe body;

a sliding layer formed on an outside surface of said oil well pipe body, said sliding layer comprising an ethylene-vinyl acetate copolymer and maleic acid modified polyethylene, said ethylene-vinyl acetate copolymer containing vinyl acetate in an amount of 5 to 60 percent by weight; and a protective layer which is formed on an outside surface of the sliding layer.

7. The oil well pipe of claim 6, wherein said protective layer comprises polyolefin resin.

8. The oil well pipe of claim 7, wherein the polyolefin resin is an ethylene-propylene block copolymer.

9. The oil well pipe of claim 8, wherein the ethylene-propylene block copolymer has a softening temperature of 140° to 170° C.

10. The oil well pipe of claim 9, wherein the sliding layer has a thickness of 1 mm to 2 mm and the protective layer has a thickness of 3 mm to 4 mm.

11. An oil well pipe for a casing comprising:

an oil well pipe body;

a sliding layer formed on an outside surface of said oil well pipe body, said sliding layer comprising a maleic acid modified ethylene-vinyl acetate copolymer, said maleic acid modified ethylene-vinyl acetate copolymer containing vinyl acetate in an amount of 5 to 60 percent by weight; and a protective layer which is formed on an outside surface of the sliding layer.

12. The oil well pipe of claim 11, wherein said protective layer comprises polyolefin resin.

13. The oil well pipe of claim 12, wherein the polyolefin resin is an ethylene propylene block copolymer.

14. The oil well pipe of claim 13, wherein the ethylene-propylene block copolymer has a softening temperature of 140° to 170° C.

15. The oil well pipe of claim 14, wherein the sliding layer has a thickness of 1 mm to 2 mm and the protective layer has a thickness of 3 mm to 4 mm.

* * * * *

UNITED STATES PATENT AND TRADEMARK OFFICE
CERTIFICATE OF CORRECTION

PATENT NO. : 5,564,413
DATED : October 15, 1996
INVENTOR(S) : Hori et al

It is certified that error appears in the above-identified patent and that said Letters Patent is hereby corrected as shown below:

```
Column 13, line 41 (Claim 4):  delete "2" and insert
                      -- 3 --.
```

Signed and Sealed this

Fourteenth Day of September, 1999

Attest:

Q. TODD DICKINSON

*Attesting Officer*    Acting Commissioner of Patents and Trademarks